US011822793B2

(12) United States Patent
Benisty et al.

(10) Patent No.: US 11,822,793 B2
(45) Date of Patent: Nov. 21, 2023

(54) COMPLETE AND FAST PROTECTION AGAINST CID CONFLICT

(71) Applicant: Western Digital Technologies, Inc., San Jose, CA (US)

(72) Inventors: Shay Benisty, Beer Sheva (IL); Ariel Navon, Revava (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 51 days.

(21) Appl. No.: 17/657,844

(22) Filed: Apr. 4, 2022

(65) Prior Publication Data
US 2023/0315302 A1    Oct. 5, 2023

(51) Int. Cl.
*G06F 3/06* (2006.01)
*G06F 11/10* (2006.01)
*G06F 11/08* (2006.01)

(52) U.S. Cl.
CPC .......... *G06F 3/0619* (2013.01); *G06F 3/0656* (2013.01); *G06F 3/0659* (2013.01); *G06F 3/0679* (2013.01); *G06F 11/08* (2013.01); *G06F 11/1004* (2013.01); *G06F 11/1068* (2013.01)

(58) Field of Classification Search
None
See application file for complete search history.

(56) References Cited

U.S. PATENT DOCUMENTS

| 2010/0174955 | A1* | 7/2010 | Carnevale | G11C 29/16 |
| | | | | 714/E11.169 |
| 2017/0090756 | A1* | 3/2017 | Sato | G06F 3/061 |
| 2018/0053545 | A1  | 2/2018 | Son | |
| 2018/0329815 | A1* | 11/2018 | Song | G06F 12/0246 |
| 2019/0042493 | A1* | 2/2019 | Angoth | G06F 13/1668 |
| 2019/0155760 | A1* | 5/2019 | Chang | G06F 3/0659 |

(Continued)

FOREIGN PATENT DOCUMENTS

| KR | 20130136004 A | 12/2013 |
| WO | 2010069045 A1 | 6/2010 |

OTHER PUBLICATIONS

Y. Li, B. Akesson, K. Lampka and K. Goossens, "Modeling and Verification of Dynamic Command Scheduling for Real-Time Memory Controllers," 2016 IEEE Real-Time and Embedded Technology and Applications Symposium (RTAS), Vienna, Austria, 2016, pp. 1-12, doi: 10.1109/RTAS.2016.7461341. (Year: 2016).*

*Primary Examiner* — Daniel F. McMahon
(74) *Attorney, Agent, or Firm* — PATTERSON + SHERIDAN, LLP; Steven H. VerSteeg

(57) ABSTRACT

The present disclosure generally relates to detecting command identification (CID) collisions in host commands. Host commands stored in submission queues are supposed to have unique CIDs. The host device selects the CID and attaches the CID to the command. Once the command is executed, the host device may reuse the CID. Sometimes, the host device reuses a CID before a command already using the CID is executed, which is a collision. Rather than search all CIDs to find a collision, redundancy bits can be created for each command, and the redundancy can be the same for multiple pending commands. The redundancy bits can be checked first to see if there is a match, followed by comparing CIDs for only those commands that have matching redundancy bits. In so doing, CID collisions are detected earlier and easier.

20 Claims, 8 Drawing Sheets

(56) References Cited

U.S. PATENT DOCUMENTS

2019/0317696 A1 10/2019 Jagadish et al.
2020/0167227 A1 5/2020 Her et al.
2022/0027069 A1* 1/2022 Henze .................. G06F 3/0655

* cited by examiner

| Bit | Description |
|---|---|
| 31:16 | Command Identifier (CID): This field specifies a unique identifier for the command when combined with the Submission Queue identifier. |
| 15 | PRP or SGL for Data Transfer (PSDT): This field specifies whether PRPs or SGLs are used for any data transfer associated with the command. If cleared to '0', the command uses PRPs for any associated data or metadata transfer. If set to '1', the command uses SGLs for any associated data or metadata transfer. PRPs shall be used for all Admin commands. |
| 14:10 | Reserved |
| 09:08 | Fused Operation (FUSE): In a fused operation, a complex command is created by "fusing" together two simpler commands. Refer to section 6.1. This field specifies whether this command is part of a fused operation and if so, which command it is in the sequence.<br><br>| Bits | Definition |<br>|---|---|<br>| 00b | Normal operation |<br>| 01b | Fused operation, first command |<br>| 10b | Fused operation, second command |<br>| 11b | Reserved | |
| 07:00 | Opcode (OPC): This field specifies the opcode of the command to be executed. |

FIG. 3

| Value | Description | I/O Command Set Specific | I/O Command Set(s)[1] |
|---|---|---|---|
| 00h | Successful Completion: The command completed without error. | No | |
| 01h | Invalid Command Opcode: A reserved coded value or an unsupported value in the command opcode field. | No | |
| 02h | Invalid Field in Command: A reserved coded value or an unsupported value in a defined field (other than the opcode field). This status code should be used unless another status code is explicitly specified for a particular condition. The field may be in the command parameters as part of the submission queue entry or in data structures pointed to by the command parameters. | No | |
| 03h | Command ID Conflict: The command identifier is already in use. Note: It is implementation specific how many commands are searched for a conflict. | No | |

FIG. 4

COMPLETE AND FAST PROTECTION AGAINST CID CONFLICT

BACKGROUND OF THE DISCLOSURE

Field of the Disclosure

Embodiments of the present disclosure generally relate to avoiding command identification (CID) conflicts or tag overlaps in data storage devices.

Description of the Related Art

Every host command that is issued from the host to a data storage device in a memory system contains a command index or command identification (CID) or tag field as an integral part of the command. The CID field contains a unique value that differs from other indices associated with outstanding host commands in the specific submission queue. After the data storage device completes execution of the host command, the data storage device then notifies the host that the host can now re-use the CID associated with the completed host command in submission of a new host command.

Typically, it is the host responsibility to ensure that the issued command index is unique and does not have an collision or overlap in the submission queue. Additionally, the standards (e.g., NVMe, SATA protocol, etc.) define that the data storage device may also verify that every incoming command received from the host contains a unique value placed at the CID field. In case of a command index collision scenario, the command is completed with an error indication. The different standards note the error differently (e.g., Command ID conflict" or "Tag overlap"). However, the error indication has the same meaning and functionality regardless of the standard. Some benchmarks and customer qualifications verify the functionality of the device under test in detecting overlapping CIDs.

The bit width of the CID depends on the implemented standard and is based on the maximum outstanding host commands supported in the memory device (i.e., the maximum outstanding host commands that the device is capable of receiving and handling at the same time). For example, in the SATA protocol the tag field is designed to support 5 bits—as to support up to 32 outstanding host commands. The NVMe standard, on the other hand, defines the CID field to be 32 bits to support $2^{\wedge}32$ (=~4.3*1e9) outstanding host commands. The number of NVMe commands is not a practical limitation, and each embodiment supports a realistic maximum number of the outstanding commands, which is significantly lower than the theoretical number allowed in the NVMe standard.

In current systems, the data storage device maintains a list of all outstanding host commands in the system. The CID value of each outstanding host command is also stored in the memory in association with the respective command. Upon receiving a new host command, the data storage device verifies CID overlap by comparing the CID value that is received in the incoming host command with the CID values of all outstanding host commands stored in the memory per submission queue.

When the maximum number of outstanding commands is low, the implementation is straight-forward. For example, the implementation can involve a bitmap register that holds the CID of all current outstanding host commands for storing them internally in the memory device, and then verifying that the slot of the new CID is cleared. Otherwise, CID overlap has occurred. Using this simple method, the CID overlap detection consumes just a single HW cycle.

However, checking all CIDs is not applicable when the bit width of the CID field is large (i.e., designed to support a large number of bits), since checking all CID values requires comparing the CID value of the incoming host command with a vast number of CID values stored in the data storage device. For example, in the NVMe standard the 32-bit CID field is designed to support $2^{\wedge}32$ outstanding host commands. In such case, the incoming CID value is to be compared against $2^{\wedge}32$ CID values.

Therefore, there is a need in the art for an improved manner to determine CID collisions.

SUMMARY OF THE DISCLOSURE

The present disclosure generally relates to detecting command identification (CID) collisions in host commands. Host commands stored in submission queues are supposed to have unique CIDs. The host device selects the CID and attaches the CID to the command. Once the command is executed, the host device may reuse the CID. Sometimes, the host device reuses a CID before a command already using the CID is executed, which is a collision. Rather than search all CIDs to find a collision, redundancy bits can be created for each command, and the redundancy can be the same for multiple pending commands. The redundancy bits can be checked first to see if there is a match, followed by comparing CIDs for only those commands that have matching redundancy bits. In so doing, CID collisions are detected earlier and easier.

In one embodiment, a data storage device comprises: a memory device; and a controller coupled to the memory device, wherein the controller is configured to: calculate redundancy bits for a first host command; compare the calculated redundancy bits to redundancy bits for at least one additional host command; determine that the calculated redundancy bits for the first host command match the redundancy bits for the at least one additional host command; and compare command identifications (CIDs) for the first host command and the at least one additional host command.

In another embodiment, a data storage device comprises: a memory device; and a controller coupled to the memory device, wherein the controller is configured to: monitor a submission queue for host commands; capture command identifications (CIDs) for each host command in the submission queue; log the CIDs for each host command; determine whether there is a CID collision between host commands in the submission queue; and receive a doorbell ringing indication from a host device, wherein the determining occurs prior to receiving the doorbell ringing indication.

In another embodiment, a data storage device comprises: memory means; and a controller coupled to the memory means, wherein the controller is configured to: detect command identification (CID) collisions for host commands, wherein the detecting comprises either: detecting the CID collisions prior to the host command informing the controller that host commands are disposed in a submission queue; or detecting a redundancy bit match for multiple host commands and then detecting a CID collisions for host commands having matching redundancy bits.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a table indicating a first double word of a NVMe command.

FIG. 4 is a table indicating status code fields in completion queue entries.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to detecting command identification (CID) collisions in host commands. Host commands stored in submission queues are supposed to have unique CIDs. The host device selects the CID and attaches the CID to the command. Once the command is executed, the host device may reuse the CID. Sometimes, the host device reuses a CID before a command already using the CID is executed, which is a collision. Rather than search all CIDs to find a collision, redundancy bits can be created for each command, and the redundancy can be the same for multiple pending commands. The redundancy bits can be checked first to see if there is a match, followed by comparing CIDs for only those commands that have matching redundancy bits. In so doing, CID collisions are detected earlier and easier.

Figure 1:
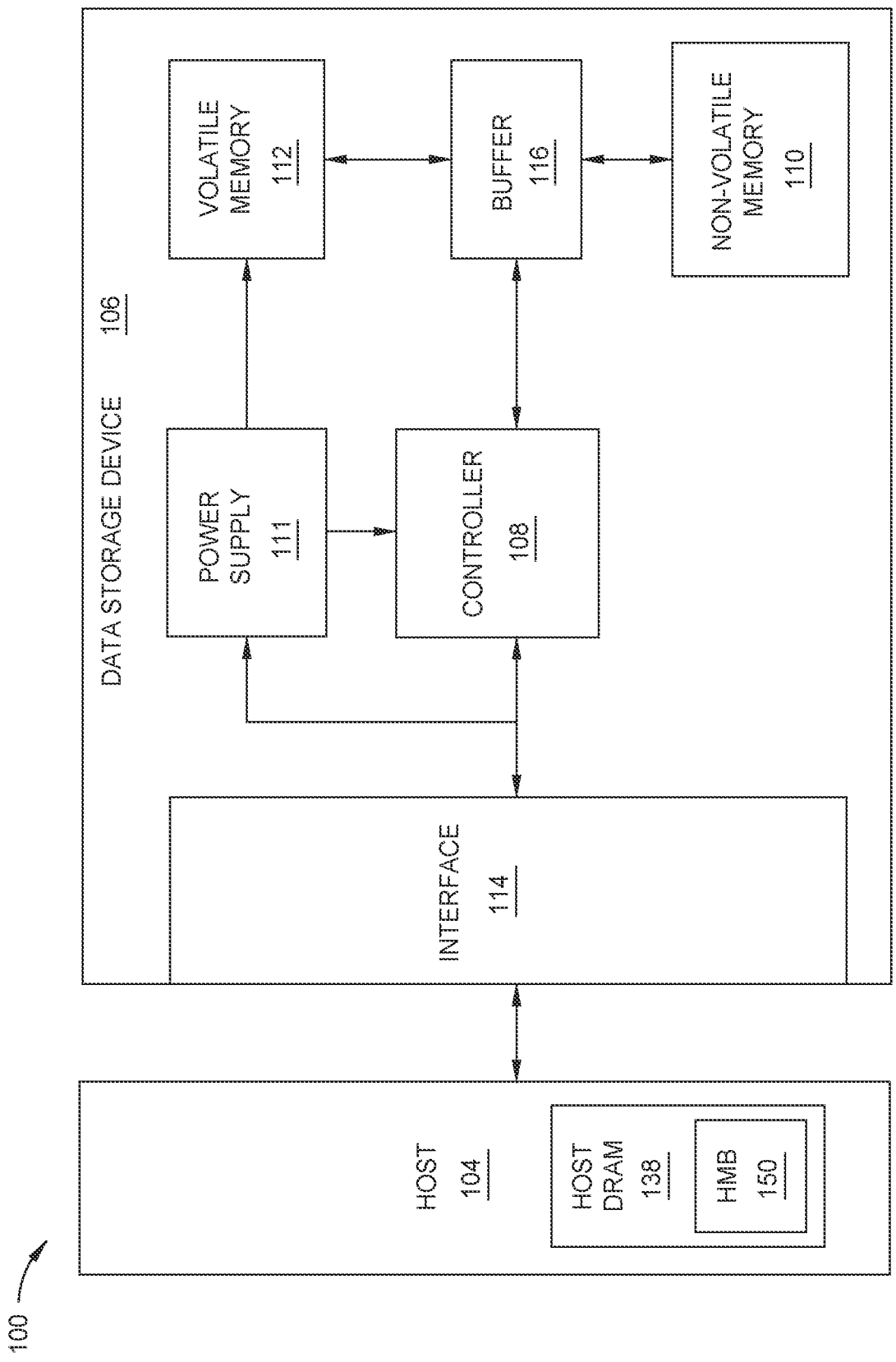
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. The host DRAM 138 includes a host memory buffer (HMB) 150. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart"pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128MB, 256MB, 512MB, 1GB, 2GB, 4GB, 8GB, 16GB, 32GB, 64GB, 128GB, 256GB, 512GB, 1TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Furthermore, the controller 108 may store data and retrieve data from the HMB 150. The HMB 150 is a portion of the host DRAM 138 that is apportioned for use by the controller 108 without host device 104 interaction. For example, the HMB 150 may be used to store data normally stored in an internal RAM, such as SRAM or DRAM. In other examples, the controller 108 may store data in the HMB 150 during a shutdown operation such that the data may not be lost due to flushing of the volatile memory 112. Furthermore, latency of accessing and retrieving data from the HMB 150 may be quicker than accessing and retrieving data of the NVM 110, such that the controller 108 may program data to the HMB 150 during the operation of the data storage device 106 and commit the data that is programmed to the HMB 150 to the NVM 110 at certain points during the operation of the data storage device 106.

In NVMe protocol, the HMB 150 may be accessed by the controller 108 when the data storage device 106 is in a low power mode. For example, if the controller 108 indicates support for the HMB Prohibit Non-Operational Access (NAP) in the Controller Attributes (CTRATT) field in the Identify Controller data structure and the NAP bit is set to 'Cl' (disabled), then the controller 108 may access the HMB 150 while processing a command submitted to the Admin Submission Queue. However, when the Non-Operational Access Prohibit is enabled, the controller 108 may not access the HMB 150 in order to perform controller-initiated activity, such as an activity not directly associated with a host command. It is to be understood that the previously listed example is not intended to be limiting, but to provide an example of a possible embodiment.

Figure 2:
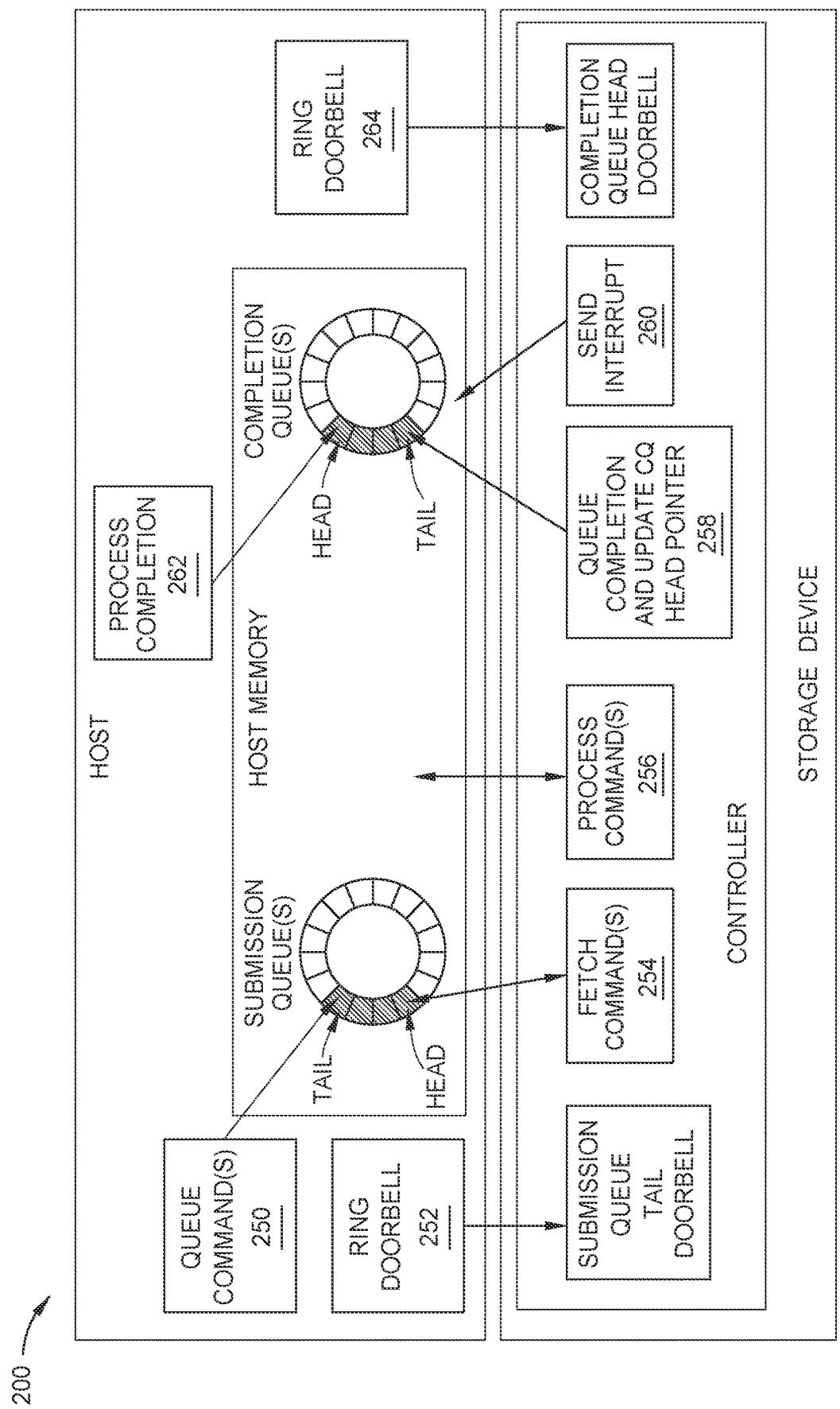
FIG. 2 is a block diagram illustrating a method of operating a storage device to execute a read or write command, according to certain embodiments.

FIG. 2 is a block diagram illustrating a method 200 of operating a storage device to execute a read or write command, according to one embodiment. Method 200 may be used with the storage system 100 of FIG. 1 having the host device 104 and the data storage device 106, where the data storage device includes the controller 108.

Method 200 begins at operation 250, where the host device writes a command into a submission queue (SQ) as an entry. The host device may write one or more commands into the submission queue at operation 250. The commands may be read commands or write commands. The host device may comprise one or more submission queues.

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue (CQ) of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

As will be discussed herein, redundancy bits (e.g., cyclical redundancy check (CRC) or other parity type) are added to the CID table that stores the CID for all outstanding host commands. The redundancy bits will be cached in flops and not in SRAM within the controller. Whenever a new command is received, the CRC of the CID is calculated and compared against the CRC of the CID for pending commands in one cycle to determine whether there are any CRC matches. Then, the CID RAM is accessed only for the entries where the CRC matches. Using the method, the number of accesses to the RAM is reduced significantly and hence performance requirements can be met and power usage reduced.

In one embodiment, the submission queues are implemented in a controller memory buffer (CMB). The controller will monitor any host write access to the submission queues such that the new CIDs are captured and logged in a CID table even before the doorbell is rung. In such an embodiment, better protection is obtained against any possible CID collision issue compared to the case where the submission queues are located within the host memory.

FIG. 3 is a table indicating a first double word of a NVMe command. As shown in FIG. 3, the CID field is combined with the submission queue ID and must be a unique number that represents the command. For NVMe, the tag will be equal to {SQ ID, CID}.

FIG. 4 is a table indicating status code fields in completion queue entries. In the case of a CID collision, the data storage device may complete the command with an error using the command ID conflict status bit as shown in FIG. 4.

As discussed herein, the embodiments disclose a manner of detecting possible CID collisions or tag overlaps for host commands in the data storage device by carrying out a pre-comparison process of information associated with the host commands. The pre-comparison process is carried out in the data storage device by using redundancy flops holding redundant information for each tag or CID stored in the data storage device in association with an outstanding host command.

Pre-comparison optimizes the operation of a subsequent tag overlap or CID collision detection process in which the actual tag or CID in the incoming host command is compared against outstanding tags or CIDs in the system. The pre-comparison process reduces internal reads to a limited set of detected candidate tags or CIDs, and thus streamlines the CID or tag validation step in command processing, potentially improving latency (especially in controllers supporting a very large number of commands) and reducing command handling overhead.

Figure 5:
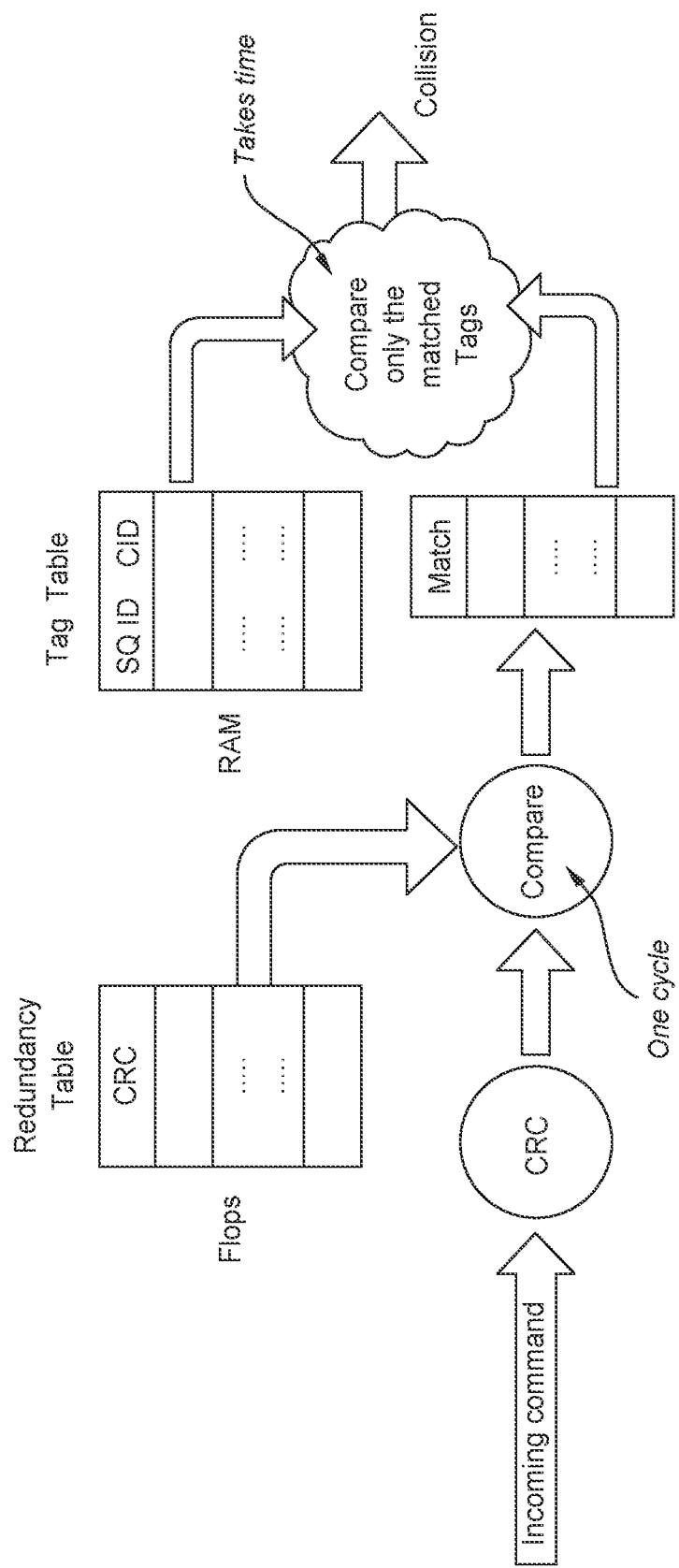
FIG. 5 is a schematic illustration of a redundancy table concept according to one embodiment.

FIG. 5 is a schematic illustration of a redundancy table concept according to one embodiment. The CRC of the CID of a newly arrived command is calculated and compared against the redundancy table. Only matched CRCs will go to the next phase of reading the tag or CID table which holds the pending tags or CIDs and compares the pending tags or CIDs against the newly arrived tags or CIDs.

Figure 6:
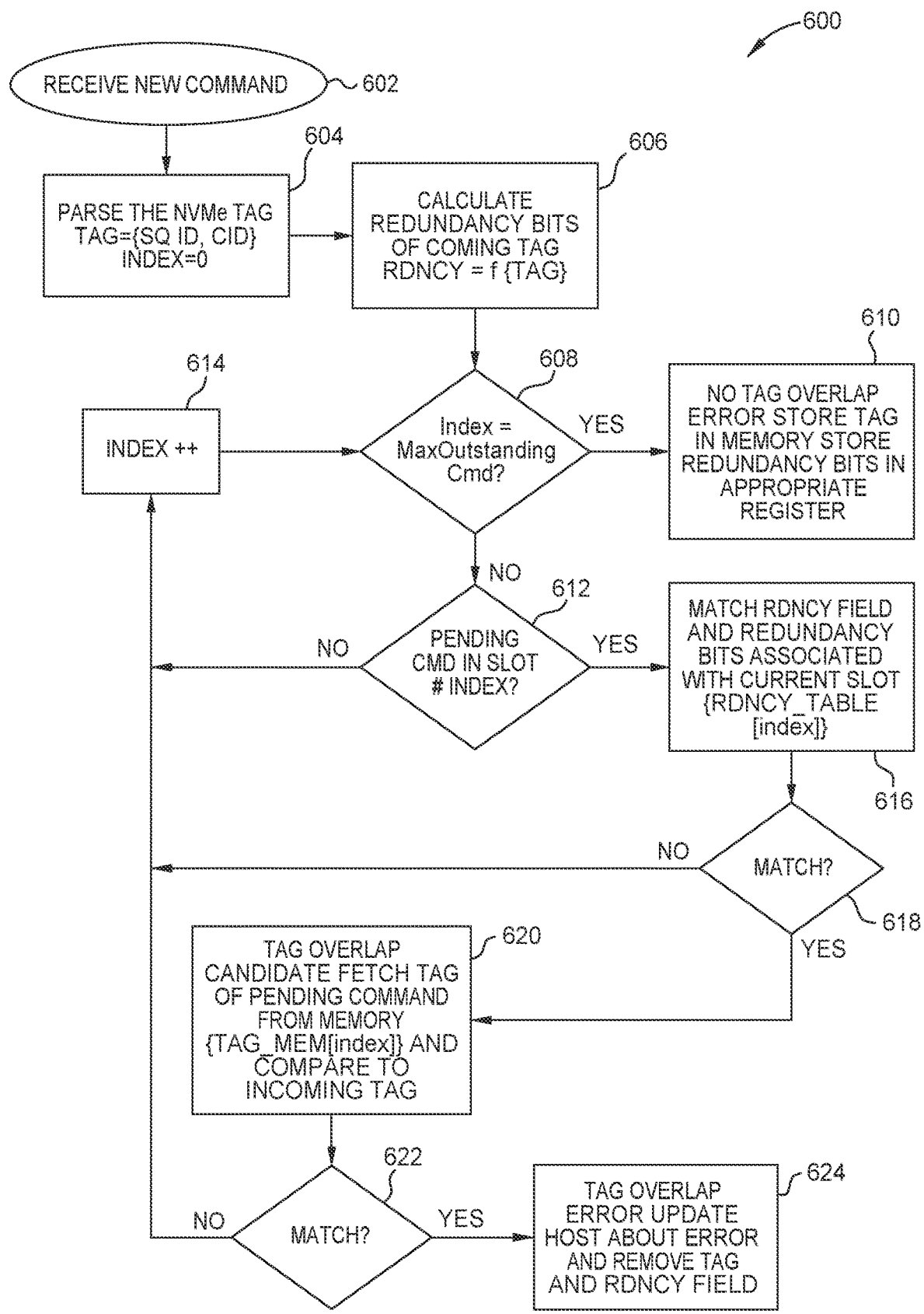
FIG. 6 is a flowchart illustrating CID collision identification according to one embodiment.

FIG. 6 is a flowchart 600 illustrating CID collision identification according to one embodiment. At 602, a new command is received in a submission queue, and the NVMe tag is parsed at 604. Redundant information (for example, in one or more bits), is generated for each outstanding host command at 606, and the redundant information is stored in internal registers in the data storage device in association with each outstanding tag. The actual tags are stored in the memory. The value of those redundant bits is a result of a simple mathematical computation on the original TAG. As for example, one embodiment may use a single redundant bit and it may hold the parity bit of the original TAG. When scanning a new host command in queue memory (prior to actually processing the command), generating redundant information with respect to the new host command and attaching this redundant information to the tag within the tag field of the incoming host command.

At 608, it is determined whether the index is equal to the maximum number of outstanding commands. If the index is equal to the maximum number of outstanding commands, then there is no tag overlap error, and the TAG is stored in memory while the redundancy bits are stored in the appropriate register at 610. However, if the index is not equal to the maximum number of outstanding commands, then a pre-comparison process begins.

The pre-comparison process involves determining whether there is a pending command in a particular slot number index at 612. If there is no such pending command, then the index is increased at 614 and the process continues back to 608. If there is such a pending command, then the pre-comparison process continues by comparing the redundant information that is generated with respect to the incoming host command and between the bits in the internal register holding redundant information that have been generated with respect to outstanding host commands at 616. Such pre-comparison process is carried out in the device for detecting a match between redundant information coming in via an incoming tag and redundant information generated with respect to tags of outstanding host commands in the memory device. If there is no match, then the index is increased at 614 and the process continues back to 608. If there is a match determined at 618, then the detected matches of redundant bits are marked as possible candidates for tag overlap at 620. Additionally, the actual tag is compared with actual tags of other pending commands that match the redundant bits. If there is no match, then the index is increased at 614 and the process continues at 608. If there is a match determined at 622, then there is a tag overlap error and the host device is informed about the error, and the TAG and RDNCY fields are removed at 624. If there is no match, then the index is increased at 614 and the process continues back to 608.

Such pre-comparison process conditions and affects the operation of a subsequent tag overlap detection process, in which the actual tag in the incoming host command is compared against outstanding tags in the system. If possible candidates of redundant bits for tag overlap are not detected at 618, then the device controller executes the incoming host command because there is no tag overlap in the device. Stated another way, if the process continues to 614, the command is executed.

If possible candidates of redundant bits for tag overlap are detected, the device performs a tag overlap detection process for reading the tag bits associated with the candidates of redundant information from the data storage device memory and then compares the actual tag in the incoming host command and the actual tags read from the memory at 620. If the tag in the incoming command does not match any of the tags outstanding in the memory, then the device executes the incoming host command because there is no tag overlap in the device. Stated another way, if the process continues to 614, the command is executed.

If the tag in the incoming command matches anyone of the tags outstanding in the memory at 622, then a tag overlap error is detected. The current command should be aborted with the appropriate error code at 624. The new tag and its redundant data must not be stored in the device at 624.

After executing the host command in the memory device, the device issues a completion notification to the host notifying the host that the tag associated with the host command is free (not in use anymore) and may be now re-used by the host for issuing a new host command.

In one embodiment, the submission queues are implemented in CMB. The device controller monitors any Host write accesses to the submission queues. The new CIDs are captured and logged in the CID table even before ringing the doorbell. The embodiment provides better protection against any possible CID collision issue comparing to the case where the submission queues are stored in host memory.

Figure 7:
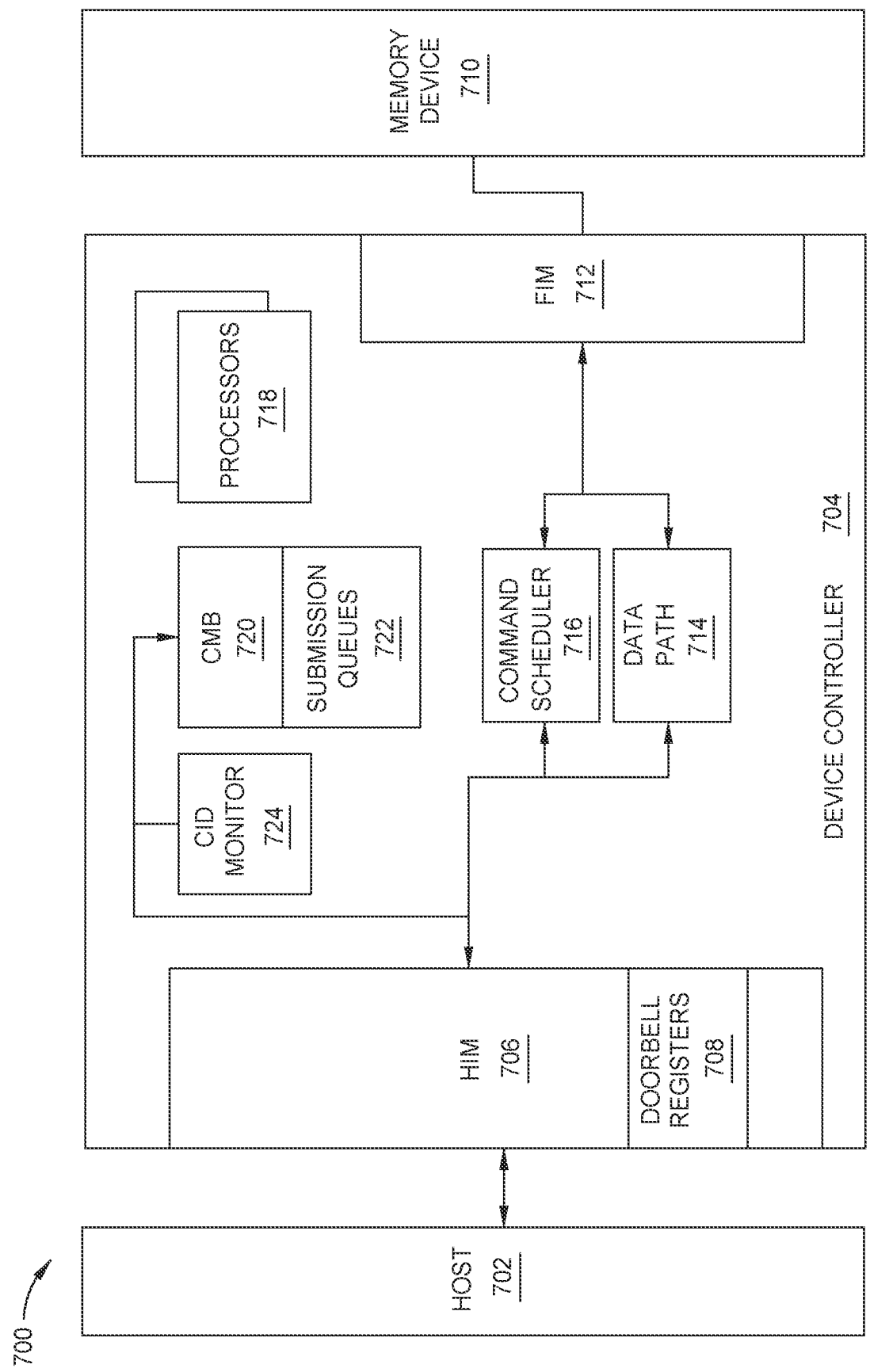
FIG. 7 is a schematic illustration of a storage system according to one embodiment.

FIG. 7 is a schematic illustration of a storage system 700 according to one embodiment. In FIG. 7, the CMB is implemented in SRAM but it is to be understood that the CMD could also be implemented in DRAM. The CID monitor updates the Redundancy and Tag table by monitoring host write transactions towards the CMB even before the host rings the doorbell and thus provides better protection. The storage system 700 includes the host device 702 coupled to the device controller 704 through a host interface module (HIM) 706. The HIM 706 includes one or more doorbell registers 708. The device controller 704 is coupled to the memory device 710 through a flash interface module (FIM) 712. The data path 714 which includes error correction (ECC), RAID, and security is disposed between the HIM 706 and FIM 712 as is a command scheduler 716. One or more processors 718 are also present in the device controller 704. Device controller 704 includes a CMB 720 that includes one or more submission queues 722. A CID monitor 724 is present in the device controller 704 to monitor the incoming host writes to the submission queues 722 and to update the redundancy and tag tables.

In yet another embodiment, the redundant CRC bits are stored in SRAM while the Tag table is stored in DRAM. The number of redundant CRC bits allocated for the purpose of detecting possible tag overlap of host commands in the memory system may be configurable so as to allow tuning of the number of allocated flops at the redundancy table according to the actual, typical size of the submission queue. Moreover, the CRC size may be dynamically adapted according to the frequency of collision occasions, as to efficiently handle the trade-off between size of allocated flops and minimizing the search time at the matched TAG commands.

In yet another embodiment, other collision detection approaches other than a CRC are contemplated. For example, if the data storage device detects that the host is allocating CIDs sequentially across queues, then a simplified flow could simply set a high watermark on the CID which moves as commands are processed. Similarly, in BIOS situations where the max queue depth is two, pre-comparison processing may be disabled as the submission queue can only have one outstanding command anyway.

Figure 8:
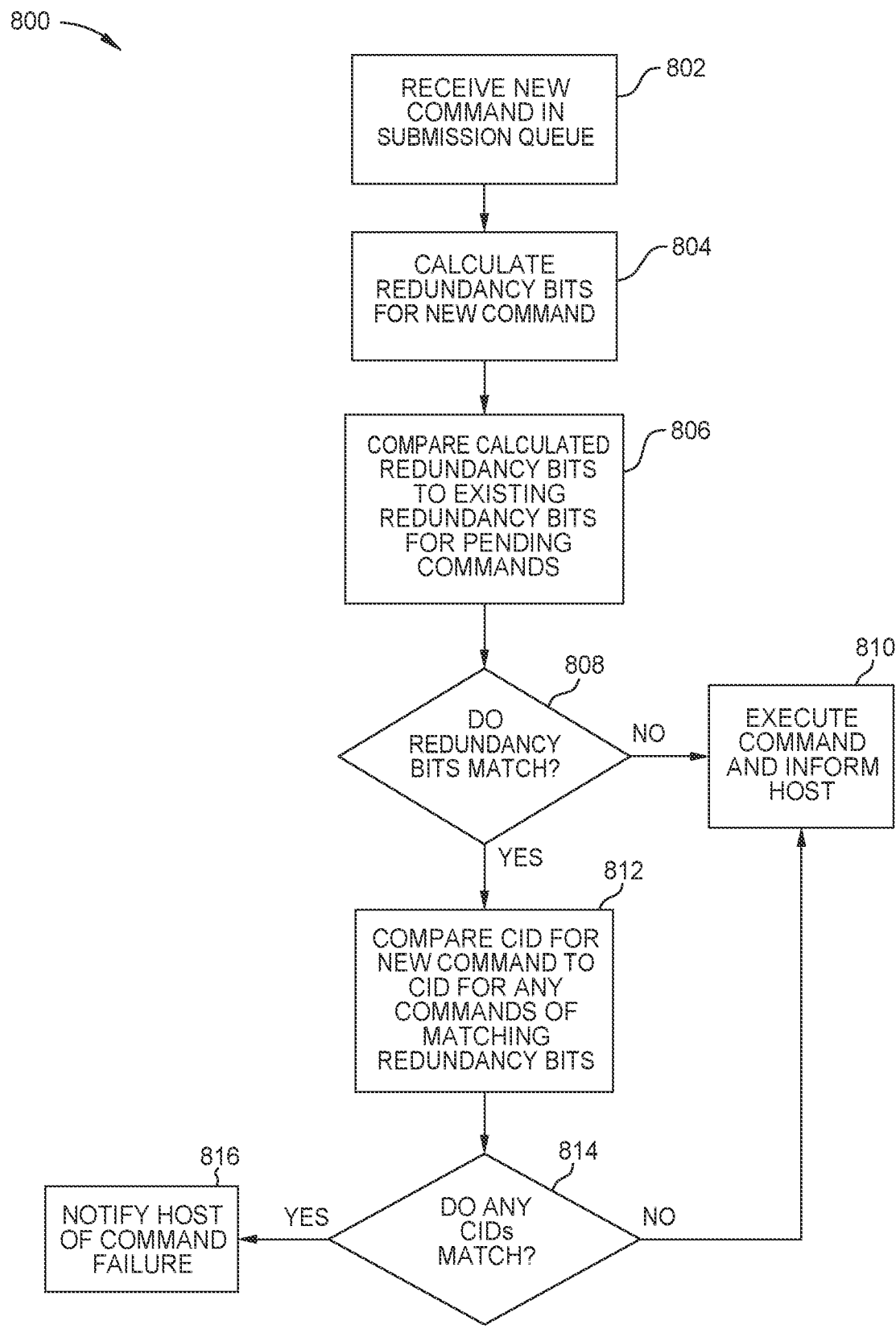
FIG. 8 is a flowchart illustrating CID collision identification according to one embodiment.

FIG. 8 is a flowchart 800 illustrating CID collision identification according to one embodiment. Initially, a new command is received in the submission queue at 802 and redundancy bits are then calculated for the new command at 804. The calculated redundancy bits are then compared to redundancy bits for other pending commands at 806. If there are no matches between redundancy bits at 808, then the new command may be executed and the host so informed at 810. If there is at least one match between redundancy bits at 808, then the CID for the new command is compared to the CID for any pending commands that have matching redundancy bits at 812. If the CIDs do not match at 814, then the new command may be executed and the host so informed at 810. If there is a match between the CIDs, then the host is informed of the command failure due to a collision or tag overlap at 816. It is to be understood that all except 810 may be performed either before or after the host device rings the doorbell, depending upon the location of the submission queue. It is also to be noted that the comparison of redundancy bits and CIDs is performed within a submission queue and not across submission queues. Stated another way, identical CIDs or tags are possible so long as the CIDs or tags are in different submission queues.

By detecting CID collisions early, performance impact of the collisions is reduced even when a huge number of outstanding commands are in a submission queue. Additionally, less power is utilized as less RAM access is needed per input/output (I/O). When the submission queue is in the CMB, any collision is detected even once the doorbell transaction is on the way.

In one embodiment, a data storage device comprises: a memory device; and a controller coupled to the memory device, wherein the controller is configured to: calculate redundancy bits for a first host command; compare the calculated redundancy bits to redundancy bits for at least one additional host command; determine that the calculated redundancy bits for the first host command match the redundancy bits for the at least one additional host command; and compare command identifications (CIDs) for the first host command and the at least one additional host command. The controller is configured to send a notification to a host device that the CID of the first host command conflicts with the CID of the at least one additional host command. The controller is configured to store the redundancy bits in registers in the controller and store the CIDs in the memory device. The controller is configured to attach calculated redundancy bits to the CIDs within a CID field of each received host command. The controller is configured to determine whether an index of host commands maintained by the controller is equal to a number of maximum outstanding commands. The controller is configured to determine whether there is a pending host command in a slot identified for the first host command. The controller is configured to determine whether there is a match between CIDs for the first host command and the at least one additional host command. The redundancy bits are parity bits. The controller is configured to fetch redundancy bits for the at least one additional host command. The controller is configured to fetch CIDs for the at least one additional host command upon determining that the calculated redundancy bits match the redundancy bits for the at least one additional host command.

In another embodiment, a data storage device comprises: a memory device; and a controller coupled to the memory device, wherein the controller is configured to: monitor a submission queue for host commands; capture command identifications (CIDs) for each host command in the submission queue; log the CIDs for each host command; determine whether there is a CID collision between host commands in the submission queue; and receive a doorbell ringing indication from a host device, wherein the determining occurs prior to receiving the doorbell ringing indication. The submission queue is disposed in a controller memory buffer (CMB). The controller comprises a CID monitor that is coupled between a host interface module and a controller memory buffer (CMB). The controller comprises redundancy flops for storing redundancy information for incoming host commands. The controller comprises random access memory (RAM) for storing the CIDs. The controller is configured to notify the host device of the CID collision prior to receiving the doorbell ringing indication. The controller is configured to mimic host device operation in collision detection logic upon determining a pattern in host command CID allocation by the host device.

In another embodiment, a data storage device comprises: memory means; and a controller coupled to the memory means, wherein the controller is configured to: detect command identification (CID) collisions for host commands, wherein the detecting comprises either: detecting the CID collisions prior to the host command informing the controller that host commands are disposed in a submission queue; or detecting a redundancy bit match for multiple host commands and then detecting a CID collisions for host commands having matching redundancy bits. The controller comprises multiple submission queues and wherein the detecting CID collisions is performed per submission queue. The redundancy bits are cyclic redundancy check (CRC) bits and are stored in SRAM, and the CIDs are stored in DRAM; or the redundancy bits are CRC bits stored in flops, and the CIDs are stored in RAM.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
   a memory device; and
   a controller coupled to the memory device, wherein the controller is configured to:
      calculate redundancy bits for a first host command;
      compare the calculated redundancy bits to redundancy bits for at least one additional host command;
      determine that the calculated redundancy bits for the first host command match the redundancy bits for the at least one additional host command; and
      compare command identifications (CIDs) for the first host command and the at least one additional host command.

2. The data storage device of claim 1, wherein the controller is configured to send a notification to a host device that the CID of the first host command conflicts with the CID of the at least one additional host command.

3. The data storage device of claim 1, wherein the controller is configured to store the redundancy bits in registers in the controller and store the CIDs in the memory device.

4. The data storage device of claim 1, wherein the controller is configured to attach calculated redundancy bits to the CIDs within a CID field of each received host command.

5. The data storage device of claim 1, wherein the controller is configured to determine whether an index of host commands maintained by the controller is equal to a number of maximum outstanding commands.

6. The data storage device of claim 5, wherein the controller is configured to determine whether there is a pending host command in a slot identified for the first host command.

7. The data storage device of claim 1, wherein the controller is configured to determine whether there is a match between CIDs for the first host command and the at least one additional host command.

8. The data storage device of claim 1, wherein the redundancy bits are parity bits.

9. The data storage device of claim 1, wherein the controller is configured to fetch redundancy bits for the at least one additional host command.

10. The data storage device of claim 1, wherein the controller is configured to fetch CIDs for the at least one additional host command upon determining that the calculated redundancy bits match the redundancy bits for the at least one additional host command.

11. A data storage device, comprising:
   a memory device; and
   a controller coupled to the memory device, wherein the controller is configured to:
      monitor a submission queue for host commands;
      capture command identifications (CIDs) for each host command in the submission queue;
      log the CIDs for each host command;
      determine whether there is a CID collision between host commands in the submission queue; and receive a doorbell ringing indication from a host device, wherein the determining occurs prior to receiving the doorbell ringing indication.

12. The data storage device of claim 11, wherein the submission queue is disposed in a controller memory buffer (CMB).

13. The data storage device of claim 11, wherein the controller comprises a CID monitor that is coupled between a host interface module and a controller memory buffer (CMB).

14. The data storage device of claim 11, wherein the controller comprises redundancy flops for storing redundancy information for incoming host commands.

15. The data storage device of claim 11, wherein the controller comprises random access memory (RAM) for storing the CIDs.

16. The data storage device of claim 11, wherein the controller is configured to notify the host device of the CID collision prior to receiving the doorbell ringing indication.

17. The data storage device of claim 1, wherein the controller is configured to mimic host device operation in collision detection logic upon determining a pattern in host command CID allocation by the host device.

18. A data storage device, comprising:
memory means; and
a controller coupled to the memory means, wherein the controller is configured to:
 detect command identification (CID) collisions for host commands, wherein the detecting comprises either:
  detecting the CID collisions prior to the host command informing the controller that host commands are disposed in a submission queue; or
  detecting a redundancy bit match for multiple host commands and then detecting a CID collisions for host commands having matching redundancy bits.

19. The data storage device of claim 18, wherein the controller comprises multiple submission queues and wherein the detecting CID collisions is performed per submission queue.

20. The data storage device of claim 19, wherein:
the redundancy bits are cyclic redundancy check (CRC) bits and are stored in SRAM, and the CIDs are stored in DRAM; or
the redundancy bits are CRC bits stored in flops, and the CIDs are stored in RAM.

* * * * *